United States Patent
Rauschenberg et al.

(10) Patent No.: US 10,309,868 B2
(45) Date of Patent: Jun. 4, 2019

(54) METHOD FOR PROVIDING SIMULATED SMOKE AND A SMOKE GENERATOR APPARATUS THEREFOR

(71) Applicant: The Boeing Company, Chicago, OH (US)

(72) Inventors: Andrew C. Rauschenberg, Seattle, WA (US); Steven M. Barton, Mukilteo, WA (US); John D. Miller, Tokyo (JP)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 15/193,389

(22) Filed: Jun. 27, 2016

(65) Prior Publication Data

US 2017/0370800 A1 Dec. 28, 2017

(51) Int. Cl.
*A01G 13/06* (2006.01)
*G01M 9/06* (2006.01)
*G01M 3/20* (2006.01)
*G08B 29/14* (2006.01)

(52) U.S. Cl.
CPC .............. *G01M 9/067* (2013.01); *G01M 3/20* (2013.01); *G08B 29/145* (2013.01)

(58) Field of Classification Search
CPC .......... A01G 13/06; G01M 3/20; G01M 9/00; G01M 9/06; G01M 9/067; G08B 29/145
See application file for complete search history.

(56) References Cited

U.S. PATENT DOCUMENTS

| | | | | |
|---|---|---|---|---|
| 1,708,731 A | * | 4/1929 | MacFarlane | G01M 3/2807 417/63 |
| 3,788,301 A | * | 1/1974 | Terry | A01G 13/06 126/59.5 |
| 4,330,428 A | * | 5/1982 | Clifford | B01F 3/022 73/40.7 |
| 4,493,211 A | | 1/1985 | Weinstein | |
| 4,615,138 A | * | 10/1986 | Cale | A01K 55/00 43/128 |
| 5,922,944 A | * | 7/1999 | Pieroni | G01M 3/20 239/136 |
| 6,477,890 B1 | * | 11/2002 | Hulsebus | F41H 9/06 239/136 |
| 7,529,472 B2 | | 5/2009 | Lazzarini et al. | |
| 7,765,863 B1 | * | 8/2010 | Woolsey | G01P 5/20 73/170.04 |
| 2016/0282381 A1 | * | 9/2016 | Ferrara, Jr. | G01P 13/0093 |

FOREIGN PATENT DOCUMENTS

| | | | | |
|---|---|---|---|---|
| JP | 07148360 A | * | 6/1995 | ........ A63J 5/02 |
| JP | 2013025431 A | * | 2/2013 | ........ G08B 17/10 |
| JP | 2016181297 A | * | 10/2016 | ........ G08B 17/00 |

* cited by examiner

*Primary Examiner* — Nguyen Q. Ha
(74) *Attorney, Agent, or Firm* — Walters & Wasylyna LLC

(57) ABSTRACT

An apparatus is provided for providing simulated smoke. The apparatus comprises a reservoir including a reservoir port, and a bladder disposed in the reservoir. The bladder can be deflated to cause a fluid substance to flow through the reservoir port into the reservoir to fill the reservoir with the fluid substance to generate smoke. The bladder can be inflated to cause smoke to flow out of the reservoir through the reservoir port to provide simulated smoke.

23 Claims, 3 Drawing Sheets

METHOD FOR PROVIDING SIMULATED SMOKE AND A SMOKE GENERATOR APPARATUS THEREFOR

FIELD

The present application relates to smoke generators that provide simulated smoke, and is particularly directed to a method for providing simulated smoke and a smoke generator apparatus therefor.

BACKGROUND

There are a number of different applications for smoke generators that provide simulated smoke. As an example, an aircraft manufacturer can use simulated smoke from a smoke generator to evaluate airflow movement or to visualize air leakage. As another example, a smoke detector manufacturer can use simulated smoke from a smoke generator to evaluate smoke detector system performance.

There are also a number of different known ways of generating smoke. A drawback of known smoke generators is their inability to generate and release a small controlled volume of smoke. Another drawback of known smoke generators is their inability to provide a consistent density of smoke during release of the smoke. It would be desirable to overcome such drawbacks in the operation of known smoke generators.

SUMMARY

In one aspect, a method for providing simulated smoke comprises filling a reservoir with smoke of a predetermined density, and releasing smoke of the predetermined density from the reservoir at a rate such that the density of the released smoke is relatively consistent.

In another aspect, a method for providing simulated smoke comprises adding smoke particulates to a reservoir until a predetermined smoke density is reached, and inflating a bladder to release smoke of the predetermined density from the reservoir at a rate such that the density of the released smoke is relatively consistent.

In another aspect, a method for providing simulated smoke comprises deflating a bladder to fill a reservoir with a substance to generate smoke of a predetermined density, and inflating the bladder to release smoke of the predetermined density from the reservoir at a rate such that the density of the released smoke is relatively consistent.

In yet another aspect, an apparatus is provided for providing simulated smoke. The apparatus comprises a reservoir including a reservoir port, and a bladder disposed in the reservoir. The bladder can be deflated to cause a fluid or particulate substance to flow through the reservoir port into the reservoir to fill the reservoir with the fluid or particulate substance to generate smoke. The bladder can be inflated to cause smoke to flow out of the reservoir through the reservoir port to provide simulated smoke.

Other aspects will become apparent from the following detailed description, the accompanying drawings and the appended claims.

DETAILED DESCRIPTION

The present disclosure is directed to a method for providing simulated smoke and a smoke generator apparatus therefor. The specific construction of the smoke generator apparatus and the industry in which the apparatus is implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a method for providing simulated smoke and a smoke generator apparatus therefor implemented by the Boeing Corporation for evaluating airflow movement or visualizing air leakage for airplane parts in compliance with Federal Aviation Administration (FAA) regulations.

Figure 1:
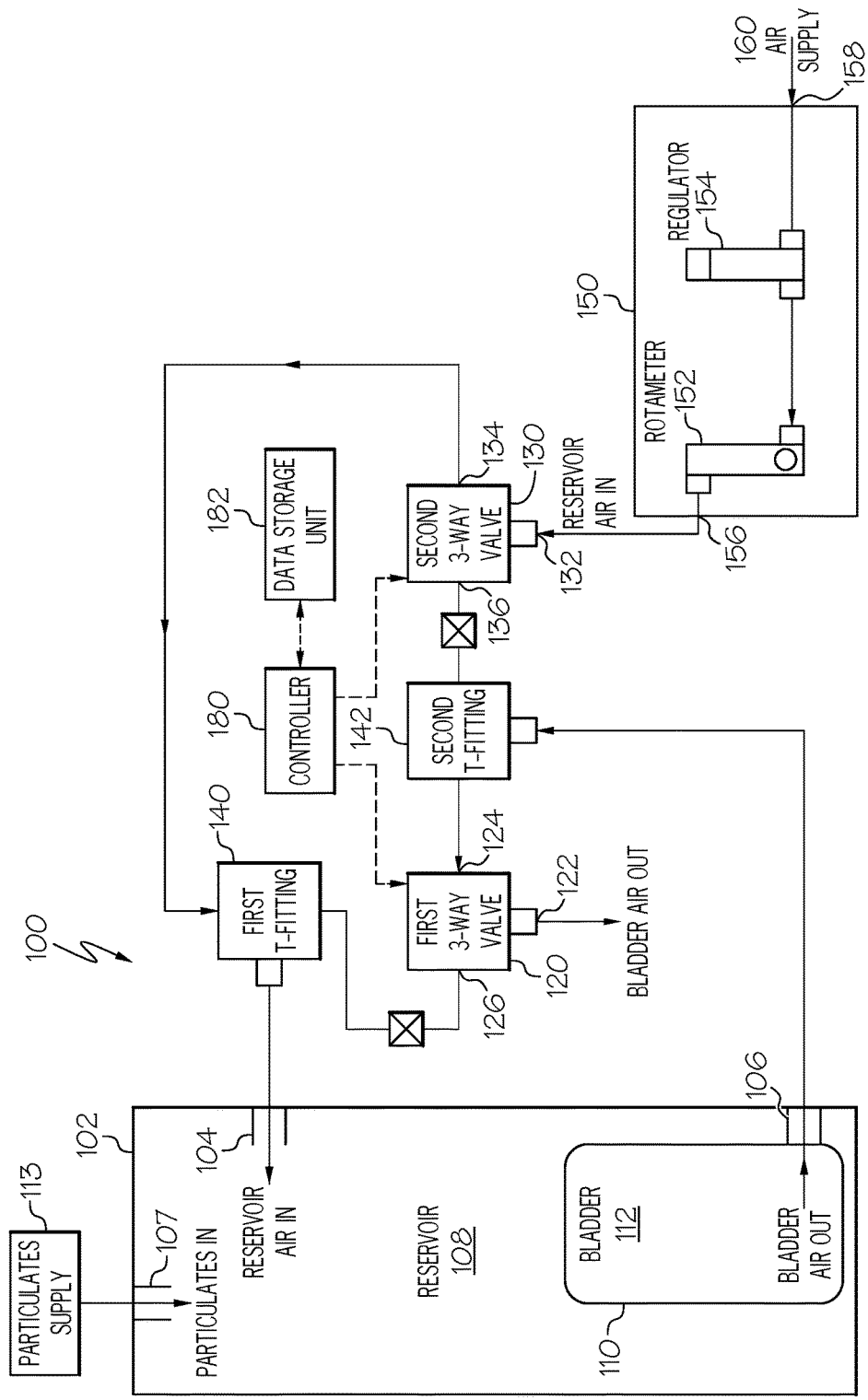
FIG. 1 is a block diagram of an example smoke generator apparatus in a first mode of operation and constructed in accordance with an embodiment.
Figure 2:
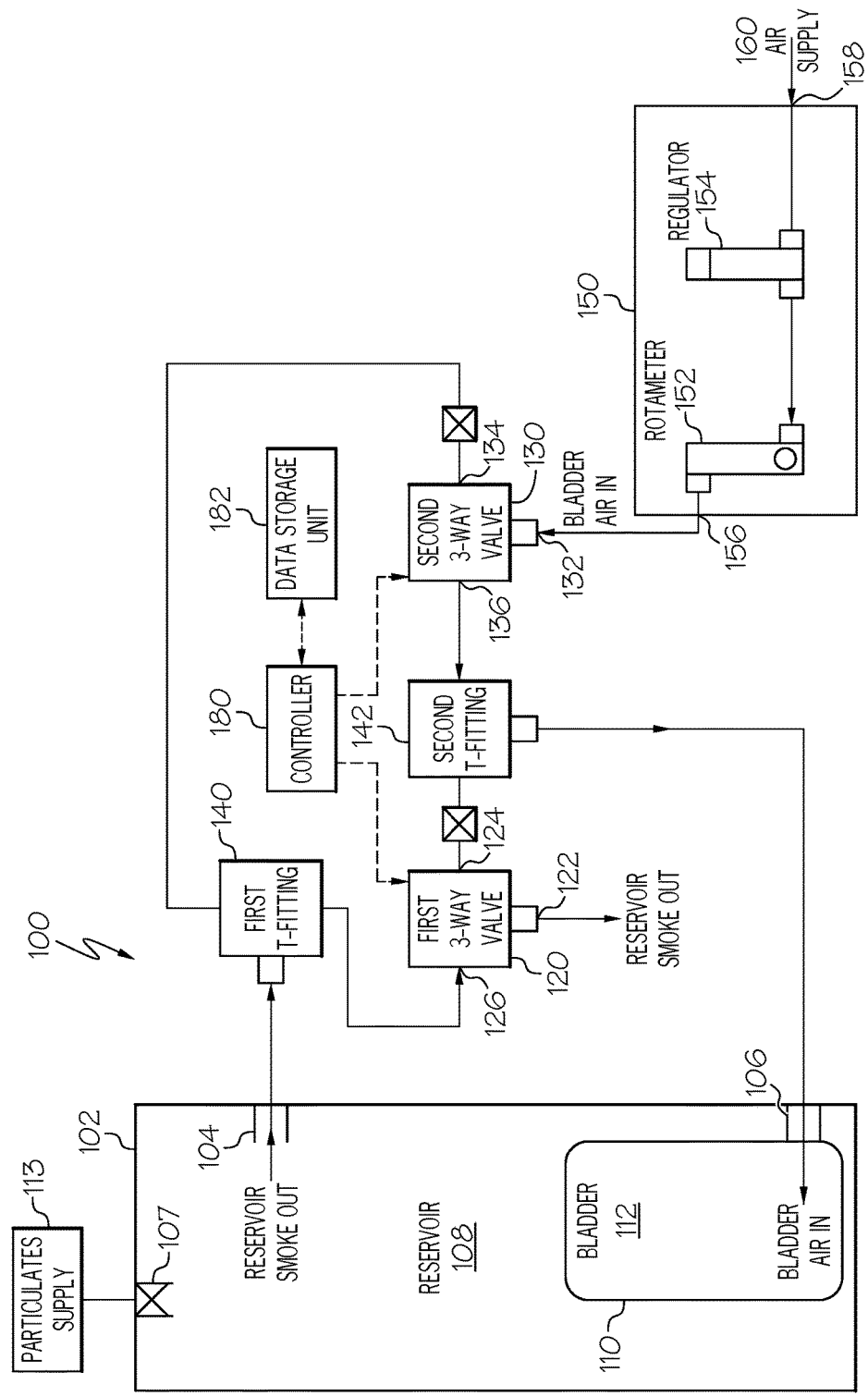
FIG. 2 is another block diagram of the smoke generator apparatus of FIG. 1 and showing the smoke generator apparatus in a second mode of operation.

Referring to FIG. 1, a block diagram of an example smoke generator apparatus 100 in a first mode of operation and constructed in accordance with an embodiment is illustrated. FIG. 2 is another block diagram of smoke generator apparatus 100 of FIG. 1 and showing smoke generator apparatus 100 in a second mode of operation. In FIGS. 1 and 2, fluid lines are shown as solid lines and electrical lines are shown as dashed lines.

Smoke generator apparatus 100 comprises reservoir 102 having reservoir port 104, bladder port 106, and particulates port 107. Reservoir 102 has internal chamber 108 that is in fluid communication with reservoir port 104. Smoke generator apparatus 100 further comprises bladder 110 disposed in internal chamber 108 of reservoir 102. Bladder 110 has internal chamber 112 that is in fluid communication with bladder port 106. Internal chamber 112 and internal chamber 108 are isolated from each other and not in fluid communication with each other. Particulates port 107 is connected in fluid communication with particulates supply 113.

Smoke generator apparatus 100 further comprises first 3-way valve 120 including first port 122, and second port 124 connectable in fluid communication with first port 122 during the first mode of operation shown in FIG. 1. First 3-way valve 120 also includes third port 126 connectable in fluid communication with first port 122 during the second mode of operation shown in FIG. 2.

Smoke generator apparatus 100 further comprises second 3-way valve 130 including fourth port 132, and fifth port 134 connectable in fluid communication with fourth port 132 during the first mode of operation shown in FIG. 1. Second 3-way valve 130 also includes sixth port 136 connectable in fluid communication with fourth port 132 during the second mode of operation shown in FIG. 2.

Smoke generator apparatus 100 further comprises first T-fitting 140 and second T-fitting 142. First T-fitting 140 fluidly interconnects reservoir port 104 of reservoir 102, third port 126 of first 3-way valve 120, and fifth port 134 of second 3-way valve 130. Second T-fitting 142 fluidly interconnects bladder port 106 of reservoir 102, second port 124 of first 3-way valve 120, and sixth port 136 of second 3-way valve 130.

Fourth port 132 of second 3-way valve 130 is connectable in fluid communication with flow control device 150 that includes rotameter 152 connected in series with regulator 154. Flow control device 150 has output port 156 connected in fluid communication with fourth port 132 of second 3-way valve 130. Flow control device 150 has input port 158 connected in fluid communication with air supply 160.

Controller 180 is operatively connected to first 3-way valve 120 and second 3-way valve 130 to control operation thereof. Controller 180 executes instructions stored in data storage unit 182 to control operation of first 3-way valve 120 and second 3-way valve 130. Controller 180 may comprise any type of technology. For example, controller 180 may comprise a dedicated-purpose computer processor. Other types of controller technologies are possible. Structure and operation of controllers and data storage units are known and, therefore, will not be further described.

During the first mode of operation shown in FIG. 1, controller 180 controls first 3-way valve 120 and second 3-way valve 130 such that air flows out of internal chamber 112 of bladder 110 through bladder port 106 to deflate bladder 110. More specifically, air flows out of internal chamber 112, through bladder port 106, through second T-fitting 142, and then through first 3-way valve 120 to atmosphere to deflate bladder 110. Fluid communication between first port 122 and third port 126 of first 3-way valve 120 is blocked during the first mode of operation of smoke generator apparatus 100 shown in FIG. 1.

When bladder 110 deflates, air flows through reservoir port 104 into internal chamber 108 of reservoir 102. More specifically, air from air supply 160 flows through flow control device 150, through second 3-way valve 130, through first T-fitting 140, and then through reservoir port 104 into internal chamber 108 of reservoir 102 to fill internal chamber 108 with air. Fluid communication between fourth port 132 and sixth port 136 of second 3-way valve 130 is blocked during the first mode of operation of smoke generator apparatus 100 shown in FIG. 1.

After internal chamber 108 is filled with air from air supply 160, particulates is supplied from particulates supply 113 through particulates port 107 to mix with the air to provide smoke of a predetermined density such as an optical obscuration density. The optical obscuration density can be between about 600 percent obscuration per foot and about 50 percent obscuration per foot, for example. This optical obscuration density range is only an example. Other optical obscuration density ranges are possible. The predetermined density of the smoke varies as a function of the amount of particulates relative to the amount of air in internal chamber 108.

Although the above description describes particulates being mixed with air after internal chamber 108 is filled with air, it is conceivable that particulates from particulates supply 113 be supplied to internal chamber 108 at the same time that air from air supply 160 is being supplied to internal chamber 108 to provide smoke of the predetermined density. It is also conceivable that particulates from particulates supply 113 be supplied to internal chamber 108 before air from air supply 160 is supplied to internal chamber 108 to provide smoke of the predetermined density.

During the second mode of operation shown in FIG. 2, controller 180 controls first 3-way valve 120 and second 3-way valve 130 such that air flows into internal chamber 112 of bladder 110 through bladder port 106 to inflate bladder 110. More specifically, air flows from air supply 160 through second 3-way valve 130, through second T-fitting 142, and then through bladder port 106 into internal chamber 112 of bladder 110 to fill internal chamber 112 with air to inflate bladder 110. Fluid communication between first port 122 and second port 124 of first 3-way valve 120 is blocked during the second mode of operation of smoke generator apparatus 100 shown in FIG. 2.

When bladder 110 inflates, smoke of the predetermined density flows out of internal chamber 108 of reservoir 102 through reservoir port 104. More specifically, smoke from internal chamber 108 flows through reservoir port 104, through first T-fitting 140, and then through first 3-way valve 120 to atmosphere to release smoke to atmosphere. Fluid communication between fourth port 132 and fifth port 134 of second 3-way valve 130 is blocked during the second mode of operation of smoke generator apparatus 100 shown in FIG. 2. In some embodiments, bladder 110 can be inflated at a rate between about 0.5 cubic feet per minute and 10 cubic feet per minute. This bladder inflation rate range is only an example. Other bladder inflation rate ranges are possible.

The rate at which the smoke is released to atmosphere is relatively constant or can be varied at a predetermined rate. In some embodiments, the released smoke is released at a rate that is the same rate the bladder 110 is filled, such as between about 0.5 cubic feet per minute and 10 cubic feet per minute. This smoke release rate range is only an example. Other smoke release rate ranges are possible. Also, the density of the released smoke is relatively consistent. In some embodiments, the density of the released smoke is relatively consistent and is the same as what is contained in the internal chamber 108, such as between about 600 percent obscuration per foot and about 50 percent obscuration per foot. This released smoke density range is only an example. Other released smoke density ranges are possible.

Figure 3:
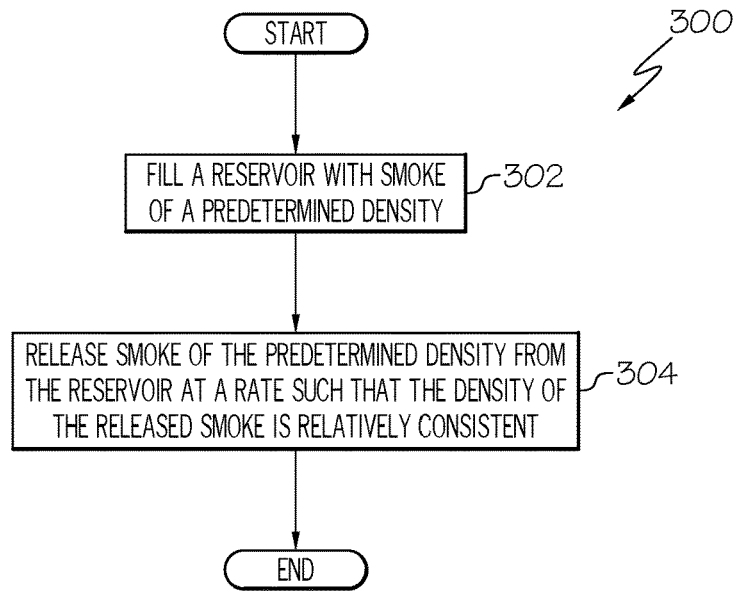
FIG. 3 is a flow diagram depicting an example method for operating the example smoke generator apparatus of FIGS. 1 and 2 to provide smoke in accordance with an embodiment.

Referring to FIG. 3, flow diagram 300 depicts an example method for operating the example smoke generator apparatus of FIGS. 1 and 2 to provide smoke in accordance with an embodiment. In block 302, a reservoir is filled with smoke of a predetermined density. The process then proceeds to block 304. In block 304, smoke of the predetermined density is released from the reservoir at a rate such that the density of the released smoke is relatively consistent. The process then ends.

Figure 4:
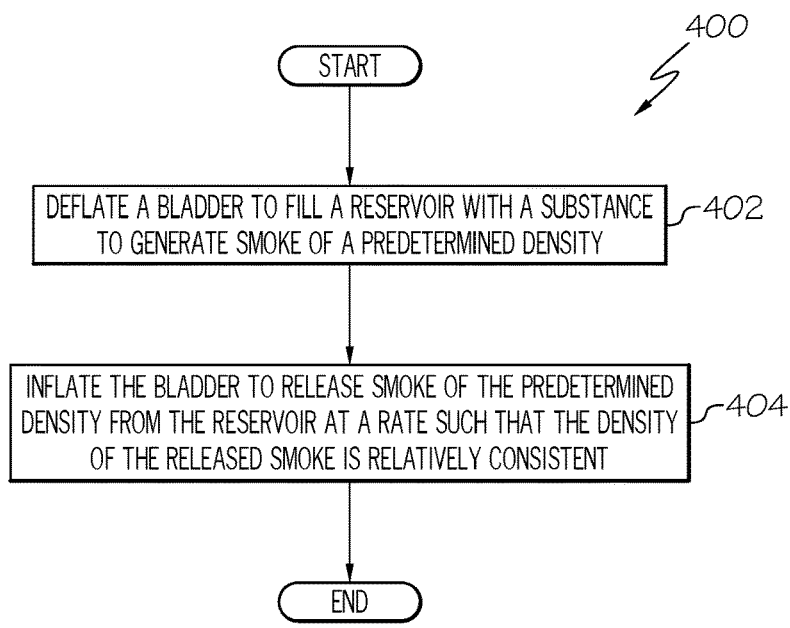
FIG. 4 is a flow diagram depicting another example method for operating the example smoke generator apparatus of FIGS. 1 and 2 to provide smoke in accordance with another embodiment.

Referring to FIG. 4, flow diagram 400 depicts another example method for operating the example smoke generator apparatus of FIGS. 1 and 2 to provide smoke in accordance with another embodiment. In block 402, a bladder is deflated to fill a reservoir with a substance to generate smoke of a predetermined density. The process then proceeds to block 404. In block 404, the bladder is inflated to release smoke of the predetermined density from the reservoir at a rate such that the density of the released smoke is relatively consistent. The process then ends.

It should be apparent that controller 180 is configured to control operation of the first and second 3-way valves such that (i) air flows from bladder 110 through first 3-way valve to atmosphere to deflate bladder 110 and air flows from air supply 160 through second 3-way valve 130 into reservoir 102 to fill reservoir 102 with air that is mixed with particulates to generate smoke during the first mode of operation, and (ii) air flows from air supply 160 through second 3-way valve 130 into bladder 110 to inflate bladder 110 and smoke flows from reservoir 102 through first 3-way valve 120 to atmosphere to release smoke during the second mode of operation.

It should also be apparent that reservoir 102 has a fixed volume, and bladder 110 has a variable volume based upon the extent of deflation or extent of inflation of bladder 110. Bladder 110 can be deflated to cause smoke to flow through reservoir port 104 into reservoir 102 to fill reservoir 102 with air that is mixed with particulates to generate smoke, and can be inflated to cause smoke to flow out of reservoir 102 through reservoir port 104.

It should further be apparent that a precise, consistent stream of low volume obscurant, such as oil or other type of fog or smoke, is provided. The flow rate of the released smoke can be adjusted to meet the needs of the customer. The flow rate depends upon a number of factors such as tubing size and nozzle size, for examples. Moreover, the density of the released smoke can be adjusted to meet the needs of the customer. The density of the released smoke depends upon a number of factors such as the amount of particulates in the smoke, for example. The flow rate of the smoke and the density of the smoke are adjustable independently of each other. Accordingly, a low flow, low density smoke; a low flow, high density smoke; a high flow, low density smoke; or a high flow, high density smoke is possible.

The low volume, consistent flow of theatrical (i.e., thermal aerosol) smoke is useful for simulating specific smoke events. As an example, the thermal aerosol smoke is useful for smoke and airflow movement visualization. As another example, the thermal aerosol smoke is useful for evaluating high sensitivity smoke detection performance, such as evaluating the effects of smoke output from a lithium-ion battery combustion protection system.

Although the above description describes controller 180 controlling operation of first 3-way valve 120 and second 3-way valve 130, it is conceivable that a controller may not be needed in some applications. For example, in some applications, first 3-way valve 120 and second 3-way valve 130 may be manually operated to fill internal chamber 108 of reservoir 102 with air to mix with particulates to generate smoke, and then subsequently manually operated to release smoke therefrom.

Also, although the above description describes a combination of first and second 3-way valves 120, 130 and first and second T-fittings, 140, 142 shown in FIGS. 1 and 2, it is conceivable that a different combination of valves and fittings may be used in other embodiments. It is also conceivable that a flow control device with components different from components of flow control device 150 shown in FIGS. 1 and 2 be used.

Also, although the above description describes smoke generator apparatus 100 providing a small controlled volume of smoke, it is conceivable that smoke generator apparatus 100 be scaled up to provide consistent densities of high volume smoke.

Further, although the above description describes smoke being released to atmosphere, it is conceivable that smoke be released to other than atmosphere. As an example, smoke can be released to an external volume such as a through a narrow opening into a confined space. As another example, smoke can be released into a controlled volume.

Although the above description describes air from air supply 160 being used to inflate bladder 110 and to fill internal chamber 108 of reservoir 102 to generate smoke, it is conceivable that a fluid substance other than air may be used. It is also conceivable that the fluid substance used to inflate bladder 110 and the fluid substance used to fill internal chamber 108 of reservoir 102 may be different from each other. It is further conceivable that the fluid substance used to fill internal chamber 108 of reservoir 102 may comprise smoke and may not need to be mixed with another substance to generate smoke.

Although the above description describes example smoke generator apparatus 100 and example methods 300, 400 for generating smoke for the aviation industry in accordance with FAA regulations, it is conceivable that smoke generator apparatus 100 and methods may be implemented to generate smoke in any industry in accordance with the applicable industry standards.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although various aspects of disclosed embodiments have been shown and described, modifications may occur to those skilled in the art upon reading the specification. The present application includes such modifications and is limited only by the scope of the claims.

What is claimed is:

1. A method for providing simulated smoke, the method comprising:
   flowing a first amount of air into an internal chamber of a reservoir;
   supplying a second amount of particulates to the internal chamber of the reservoir to mix the first amount of air in the internal chamber with the second amount of particulates to provide smoke of a predetermined density; and
   decreasing a volume of the internal chamber to release smoke of the predetermined density from the reservoir at a rate such that the density of the released smoke is relatively consistent.

2. The method according to claim 1 wherein the predetermined density is an optical obscuration density.

3. The method according to claim 2 wherein filling the reservoir with smoke of an optical obscuration density includes:
   filling the reservoir with smoke of an optical obscuration density between about 600 percent obscuration per foot and about 50 percent obscuration per foot.

4. The method according to claim 1 wherein releasing smoke of the predetermined density from the reservoir at a rate such that the density of the released smoke is relatively consistent includes:
   releasing smoke of the predetermined density from the reservoir at a rate between about 0.5 cubic feet per minute and about 10 cubic feet per minute.

5. The method according to claim 1 wherein releasing smoke of the predetermined density from the reservoir at a rate such that the density of the released smoke is relatively consistent includes:
   releasing smoke of the predetermined density from the reservoir at a rate such that the density of the released smoke is relatively consistent between about 600 percent obscuration per foot and about 50 percent obscuration per foot.

6. The method according to claim 1 wherein releasing smoke of the predetermined density from the reservoir at a rate such that the density of the released smoke is relatively consistent includes:

releasing smoke of the predetermined density from the reservoir at a rate between about 0.5 cubic feet per minute and about 10 cubic feet per minute and such that the density of the released smoke is relatively consistent between about 600 percent obscuration per foot and about 50 percent obscuration per foot.

7. The method according to claim 1 wherein the method is performed by a computer having a memory executing one or more programs of instructions which are tangibly embodied in a program storage medium readable by the computer.

8. The method according to claim 1 wherein the first amount of air is flowed into the internal chamber through a reservoir port.

9. The method according to claim 8 wherein the smoke of the predetermined density is released from the reservoir through the reservoir port.

10. The method according to claim 8 wherein the second amount of air is supplied into the internal chamber through a particulates port.

11. A method for providing simulated smoke, the method comprising:

deflating a bladder to fill a reservoir with a substance to generate smoke of a predetermined density; and inflating the bladder to release smoke of the predetermined density from the reservoir at a rate such that the density of the released smoke is relatively consistent.

12. The method according to claim 11 wherein inflating the bladder to release smoke of the predetermined density from the reservoir at a rate such that the density of the released smoke is relatively consistent includes:

inflating the bladder to release smoke of the predetermined density from the reservoir at a rate between about 0.5 cubic feet per minute and about 10 cubic feet per minute.

13. The method according to claim 11 wherein inflating the bladder to release smoke of the predetermined density from the reservoir at a rate such that the density of the released smoke is relatively consistent includes:

inflating the bladder to release smoke of the predetermined density from the reservoir at a rate such that the density of the released smoke is relatively consistent between about 600 percent obscuration per foot and about 50 percent obscuration per foot.

14. The method according to claim 11 wherein inflating the bladder to release smoke of the predetermined density from the reservoir at a rate such that the density of the released smoke is relatively consistent includes:

inflating the bladder to release smoke of the predetermined density from the reservoir at a rate between about 0.5 cubic feet per minute and about 10 cubic feet per minute such that the density of the released smoke is relatively consistent between about 600 percent obscuration per foot and about 50 percent obscuration per foot.

15. The method according to claim 11 wherein the method is performed by a computer having a memory executing one or more programs of instructions which are tangibly embodied in a program storage medium readable by the computer.

16. An apparatus for providing simulated smoke, the apparatus comprising:

a reservoir including a reservoir port; and a bladder disposed in the reservoir, wherein (i) the bladder can be deflated to cause a fluid substance to flow through the reservoir port into the reservoir to fill the reservoir with the fluid substance to generate smoke, and (ii) the bladder can be inflated to cause smoke to flow out of the reservoir through the reservoir port to provide simulated smoke.

17. The apparatus according to claim 16 wherein the reservoir has a fixed volume, and the bladder has a variable volume based upon the extent of deflation or extent of inflation of the bladder.

18. The apparatus according to claim 17 wherein the reservoir further includes a bladder port, and the bladder is connected in fluid communication with the bladder port such that fluid flows out of the bladder through the bladder port when the bladder deflates and fluid flows through the bladder port into the bladder when the bladder inflates.

19. The apparatus according to claim 18 further comprising:

a first 3-way valve including (i) a first port, (ii) a second port connectable in fluid communication with the first port during a first mode of operation, and (iii) a third port connectable in fluid communication with the first port during a second mode of operation; and a second 3-way valve including (i) a fourth port, (ii) a fifth port connectable in fluid communication with the fourth port during the first mode of operation, and (iii) a sixth port connectable in fluid communication with the fourth port during the second mode of operation.

20. The apparatus according to claim 19 further comprising:

a first T-fitting through which the reservoir port of the reservoir, the first port of the first 3-way valve, and the fifth port of the second 3-way valve are connected in fluid communication with each other; and a second T-fitting through which the bladder port of the bladder, the second port of the first 3-way valve, and the sixth port of the second 3-way valve are connected in fluid communication with each other.

21. The apparatus according to claim 20 further comprising:

a flow control device including an output port connected in fluid communication with the fourth port of the second 3-way valve and an input port connected in fluid communication with an air supply.

22. The apparatus according to claim 21 further comprising:

a controller configured to control operation of the first and second 3-way valves such that (i) air flows from the bladder through the first 3-way valve to atmosphere to deflate the bladder and air flows from the air supply through the second 3-way valve into the reservoir to fill the reservoir with air that is mixed with particulates to generate smoke during the first mode of operation, and (ii) air flows from the air supply through the second 3-way valve into the bladder to inflate the bladder and smoke flows from the reservoir through the first 3-way valve to atmosphere to release smoke during the second mode of operation.

23. The apparatus according to claim 22 wherein the controller comprises a general-purpose computer processor.

* * * * *